United States Patent
Azulay et al.

(10) Patent No.: US 11,620,141 B2
(45) Date of Patent: Apr. 4, 2023

(54) CLIENT SIDE BROWSER-BASED CACHING FOR MONITORED RESOURCES

(71) Applicant: Microsoft Technology Licensing, LLC, Redmond, WA (US)

(72) Inventors: Itamar Azulay, Mishmar Ayyalon (IL); Amir Geri, Modi'in (IL); Guy Lewin, New York City, NY (US); Yossi Haber, Gannei Tikva (IL); Meir Baruch Blachman, Ramat-Gan (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 344 days.

(21) Appl. No.: 16/924,318

(22) Filed: Jul. 9, 2020

(65) Prior Publication Data
US 2022/0012070 A1    Jan. 13, 2022

(51) Int. Cl.
  G06F 16/957   (2019.01)
  G06F 9/451    (2018.01)
  G06F 11/30    (2006.01)
  G06F 8/38     (2018.01)
  H04L 9/40     (2022.01)

(52) U.S. Cl.
  CPC .......... *G06F 9/451* (2018.02); *G06F 8/38* (2013.01); *G06F 11/302* (2013.01); *G06F 16/957* (2019.01); *H04L 63/12* (2013.01)

(58) Field of Classification Search
  CPC .... G06F 16/957; G06F 16/9574; G06F 9/451; G06F 8/38; G06F 11/302; H04L 63/12
  See application file for complete search history.

(56) References Cited

U.S. PATENT DOCUMENTS

| | | | |
|---|---|---|---|
| 6,651,142 B1 * | 11/2003 | Gorelik ............... | G06F 16/9574 711/119 |
| 8,719,216 B2 * | 5/2014 | Bremer, Jr. ......... | G06F 16/9574 715/224 |
| 2005/0172076 A1 * | 8/2005 | Olson ................. | G06F 16/9574 711/119 |

* cited by examiner

*Primary Examiner* — Alvin H Tan
(74) *Attorney, Agent, or Firm* — Weaver IP L.L.C.

(57) ABSTRACT

Methods and systems are provided for a browser in a client device that receives a user interface script-code snippet from a web page. A chain logic engine determines whether an in-memory map indicates an output value of prior execution of the UI script-code snippet. If the in-memory map does indicate the output value, it is returned from the in-memory map to generate the user interface. If not, the engine determines whether an in-local storage map indicates the prior executed snippet output. If the in-local storage map indicates the prior executed snippet output, it is returned from the in-local storage map to generate the user interface, and it is stored in the in-memory map. If not, the UI script-code snippet is executed to generate the output value, which is used to generate the user interface, and is stored in the in-memory map and in the in-local storage map.

20 Claims, 7 Drawing Sheets

CLIENT SIDE BROWSER-BASED CACHING FOR MONITORED RESOURCES

BACKGROUND

Various security products are available to provide control over data travel in cloud applications and subscription services accessed via the Internet. When a client device requests a resource from a server, a proxy server may enforce policies, detect threats, and provide governance actions with respect to the request. In one example, Microsoft® Cloud App Security (MCAS) is available for monitoring Microsoft® Office 365® subscription-based services.

In some security services, there may be an additional level of monitoring activities for websites or online applications. For example, the first level of monitoring may be performed by a proxy server. A second level may include a client side monitoring system that functions within a browser on a client device. The client side monitoring system may dynamically monitor certain activities that are client based or created by a browser, which cannot be seen by the server. The browser may perform the client side monitoring, once a page is rendered, when a user attempts to perform an action that cannot be detected by the server.

A security system provider may want to offer its customers a way to monitor methods of exporting data from web pages. Part of this effort may include monitoring all resources that are being requested or dynamically generated in a web page. Some websites rely heavily on client side-based web page rendering that occurs once the page is loaded into the browser. For example, a business analytics web service may provide reports with charts based on collected data for viewing in an interactive user interface of a browser (e.g., Microsoft® Power BI®). The charts and reports may be rendered in the browser on the client device and there may be little or no HTML (hypertext markup language) code utilized for rendering and displaying of the reports. Client side monitoring and session control may occur within the rendering of a web page on a client device. However, such client side monitoring and governance processes may severely slow the performance of a user interface (UI) of the browser and web page rendering processes.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods and systems are provided for enhanced exporting of data from web pages. In response to a request for data from a web page, browser cached data is checked for the requested data, and if present, the requested data is returned from the cache. If the requested data is not present in the browser cached data, the data is dynamically generated for return, and may be cached in the browser cached data for future data requests.

In one aspect, a browser in a client device comprising a script-code snippet manager configured to receive a user interface (UI) script-code snippet from a web page during a current session. The script-code snippet manager comprises a chain logic engine configured to determine whether an in-memory map indicates a stored output value of the UI script-code snippet generated by prior execution of the UI script-code snippet, and in response to determining the in-memory map does not indicate the stored output value of the UI script-code snippet, determine whether an in-local storage map for the browser indicates the stored output value of the UI script-code snippet generated by prior execution of the UI script-code snippet. In response to determining the in-local storage map does not indicate the output value of the UI script-code snippet, the script-code snippet manager is further configured to control execution of the UI script-code snippet for the current session to generate the output value of the UI script-code snippet, and store the output value in the in-memory map and in the in-local storage map.

The chain logic engine is further configured to, in response to determining the in-memory map does indicate the stored output value of the UI script-code snippet, return the output value of the UI script-code snippet from the in-memory map for use in the current session, or in response to determining the in-local storage map does indicate the output value of the UI script-code snippet, return the output value of the UI script-code snippet from the in-local storage map for use in the current session and storing the output value in the in-memory map.

Further features and advantages of embodiments, as well as the structure and operation of various embodiments, are described in detail below with reference to the accompanying drawings. It is noted that the methods and systems are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
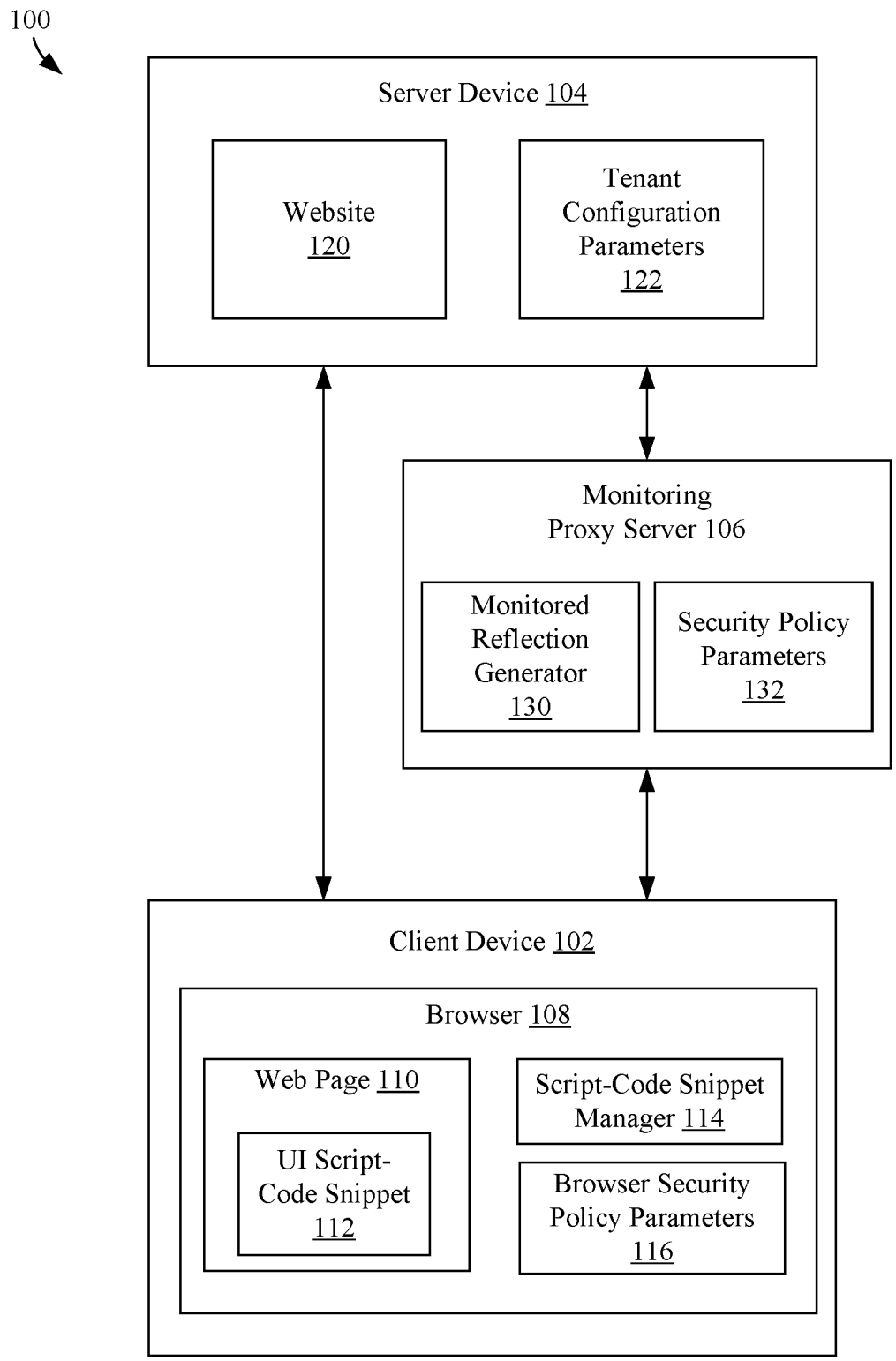
FIG. 1 is a block diagram of a system including a browser that saves output values of executed user interface script-code snippets in layers of memory for subsequent reuse, according to an example embodiment.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the disclosed embodiments. The scope of the embodiments is not limited only to the aspects disclosed herein. The disclosed embodiments merely exemplify the intended scope, and modified versions of the disclosed embodiments are also encompassed. Embodiments are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Security products for cloud based applications and user subscription services may provide policy enforcement for data communication over a network (e.g., the Internet). When a client device requests a resource from a server, a proxy server may enforce policies, detect threats, and provide governance actions with respect to the request. In one example, Microsoft® Cloud App Security (MCAS) is available for monitoring Microsoft® Office 365®) subscription-based services.

Some security products, or proxy servers, provide a man in the middle solution for service subscribers. Such services may monitor and control a user's access attempts and requests for resources (e.g., documents) from an online application (e.g., Microsoft® OneDrive®). The security service may reflect the application to the user's client device such that it appears the same in a user's browser as a direct access to the application on an application server. Prevention and detection monitoring may be performed by the proxy server on the user's interactions with the reflected application in order to apply policies and prohibit certain activities. The policies (e.g., session policies, download policies, upload policies, or policies for other types of activities) may be configured by a tenant administrator on a server device. Also, filters such as user agents may be configured for risky IDs or certain conditions. Once a user logs into a managed application, the security system may detect who the user is and which tenant they belong to, and apply polices configured for the user. For example, a user may access a Microsoft® OneDrive® account and connect work environment resources to OneDrive® in order to download a sensitive file to their client device. A real time session policy may indicate that a sensitive file cannot be downloaded to an unmanaged device. Once the user tries to download that file, a blocked-download notification may be generated according to the policy, which may notify the user that the file cannot be downloaded. However, if no download policy is configured in the proxy server, the user would be able to download the file.

In some security services, there may be an additional level for monitoring activities in websites or online applications. For example, the first level of monitoring may be performed by a proxy server, as described above, which can reflect static elements from the application server (e.g., hypertext markup language (HTML) pages and style resources, etc.). A second level of monitoring includes a client side monitoring system that functions within a browser on a client device. The client side monitoring system may dynamically monitor certain activities that are client-based or created by a browser, which cannot be seen by the server. The policies and filters used for the client side monitoring and policy enforcement may also be configured by a tenant administrator. The browser may perform the client side monitoring, once a page is rendered, when a user attempts to perform an action that cannot be detected by the server.

Some websites rely heavily on client side-based web page rendering that occurs once the page is loaded into the browser. For example, a business analytics web service may provide reports with charts based on collected data for viewing in an interactive user interface of a browser (e.g., Microsoft® Power BI®). The charts and reports may be rendered in the browser on the client device and there may be little or no HTML utilized for rendering and displaying the reports. Client side monitoring and session control may occur within the rendering of the web page on the client device for user interaction with the web page. However, such client side monitoring and governance processes may severely affect performance of the user interface (UI) of the browser and web page rendering.

The present disclosure provides embodiments for improving the performance of a user interface in a managed browser to allow for faster rendering and execution of web pages while performing client side monitoring and policy enforcement A client side proxy policy system provides a way to monitor methods of exporting data from web pages including monitoring resources that are requested or dynamically generated in a web page. The browser-based, client side method leverages browser native support for caching data in order to improve proxy performance and generically support various applications. Client side processing actions often occur repeatedly in a browser. In the present disclosure, the result of web page processing actions are cached and used again without incurring processing latency to improve user interface performance.

In one example, during browser-based rendering, when a script-code snippet of a user interface (UI) is selected from a web page for execution, a chain of command searches through layers of memory for an output value from previously executing the UI script-code snippet. If the output value is found, it is used to generate the user interface. In this manner, speed of client side rendering of a user interface is improved. If the output value is not found in the memory layers, the browser controls execution of the UI script-code snippet to generate the output value and may save the output value in the layers of memory. The browser may execute the UI script-code snippet itself, or may decide to send it to a server for execution depending on the cost of the execution.

Embodiments of the present disclosure for improving performance in client side browser-based rendering of user interface script-code snippets may be implemented in various ways. For instance, FIG. 1 is a block diagram of a system 100 including a browser that saves output values of executed user interface script-code snippets in layers of memory for subsequent reuse, according to an example embodiment.

As shown in FIG. 1, system 100 includes a client device 102, a server device 104, and a proxy server 106. Client device 102 includes a browser 108. Browser 108 includes a web page 110, a UI script-code snippet 112, a script-code snippet manager 114, and browser security policy parameters 116. Server device 104 includes a website 120 and tenant configuration parameters 122. Proxy server 106 includes a monitored reflection generator 130 and security policy parameters 132.

Client device 102 is communicatively coupled to server device 104 and proxy server 106 (e.g., via a network or combination of networks, such as the Internet). Server device 104 is also communicatively coupled to proxy server 106. Client device 102, server device 104, and proxy server 106 may each comprise any suitable computing device, such as a stationary computing device (e.g., a desktop computer or personal computer), a mobile computing device (e.g., a Microsoft® Surface® device, a personal digital assistant (PDA), a laptop computer, a notebook computer, a tablet computer such as an Apple iPad™, a netbook, etc.), a mobile phone (e.g., a cell phone, a smart phone such as an Apple iPhone, a phone implementing the Google® Android™ operating system, a Microsoft Windows® phone, etc.), a wearable computing device (e.g., a head-mounted device including smart glasses such as Google® Glass™, Oculus Rift® by Oculus VR, LLC, etc.), a gaming console/system (e.g., Microsoft Xbox®, Sony PlayStation®, Nintendo Wii® or Switch®, etc.), an appliance, a set top box, etc.

Website 120 may be a website that provides web pages in response to requests from browser 108, where the requests comprise uniform resource locators (URL). In some embodiments, website 120 may be generated by a cloud based software application that may be provided through a subscription service (e.g., Microsoft 365®) and hosted by server device 104. However, the source of web site 120 is not limited and any suitable source may be utilized. A user may interact with website 120 directly or via proxy server 106 depending how system 100 is configured by a system administrator. In some embodiments, when a web session is initiated with website 120, the user may be authenticated, for example, by an identity provider of the website. The session may persist until website 120 and/or browser 108 are closed by the user or otherwise closed. In some embodiments, server device 104 and/or website 120 may be part of a data center that provides cloud services to multiple users or business organizations (e.g., tenants). A directory of the tenants may identify corresponding service instances (e.g., containers) that each include a tenant's items, such as users, domains, subscriptions, etc. Multitenancy of server device 104 may occur where several different cloud customers access the same computing resources. In this example, the system administrator may be a tenant administrator that may populate tenant configuration parameters 122 to define the users, domains, security policies, and other aspects of the software subscription of the tenant. The tenant administrator (or system administrator) may also configure security policy parameters 132 in proxy server 106 and/or browser security policy parameters 116 in client device 102.

The tenant configuration parameters 122 may indicate which users are to be monitored (or proxied) by proxy server 106 and/or browser 108. When a user that is monitored by proxy server 106 requests webpage 110 from website 120, the webpage may be sent to proxy server 106 to apply policies that are defined by security policy parameters 132. Monitored reflection generator 130 may or may not transmit web page 110 to client device 102 depending on security policy parameters 132. For example, the user may not have permission to download web page 110, or may not have permission to request certain actions via web page 110 (e.g., uploading data or a file to server device 104) based on the security policy parameters. In instances where proxy server 106 does not allow an action requested by a user, proxy server 106 is configured to transmit a notification to client device 102 for display by browser 108, to indicate the denial of the request and/or policy issues that may have caused the denial. In instances where the user has permission to access web page 110, monitored reflection generator 130 is configured to generate a reflection comprising web page 110 and send it to client device 102 where browser 108 is configured to build a web page document object model (DOM) and display web page 110 in a user interface as reflected from a domain of proxy server 106. Further attempted interactions between browser 108 and server device 104 may be monitored and governed by proxy server 106. In one example, a user may access a cloud application (e.g., in Microsoft® OneDrive®) on server device 104, which may be a work environment resource. The user may attempt to download a sensitive file to the managed client device 102. If the tenant administrator configured a real time session policy with security policy parameters 132, which indicate that the sensitive file could not be downloaded to the user's client device 102, proxy server 106 is configured to block the download operation and transmit a notification to browser 108 indicating that the user does not have permission to download the file.

However, much of web page 110 may comprise script-code that is rendered by browser 108 rather than server device 104 for generating a user interface or a portion of a user interface. For example, script-code snippet 112 may comprise a region of operative scripting language code (e.g., JavaScript code) that may perform a function or action in web page 110. UI script-code snippet 112 may be referred to as script code snippet 112. Browser 108 may be configured to render (i.e., execute) UI script-code snippet 112 and output user interface code (e.g., all or a region of web page 110) that can be displayed in a display device (not shown) of client device 102. Browser 108 may be configured to execute UI script-code snippet 112 in response to an event in web page 110 (e.g., a user input received via web page 110 to request a function or an action). Server device 104 may not be aware of actions or events triggered in web page 110, and actions or events may be handled solely by browser 108. For such operations, a second level of monitoring may be implemented within browser 108 according to browser security policy parameters 116. Browser security policy parameters 116 may be configured by the tenant administrator (or system administrator) and may define policies and filters used in client device 102 side monitoring and policy enforcement. The monitoring system of client device 102 may be configured to dynamically monitor certain activities initiated in browser 108. Browser 108 may be configured to perform the client side monitoring, once web page 110 is rendered.

In one example of client device 102 side monitoring, a user may attempt to copy and paste sensitive text from web page 110 to a document. This process may utilize a clipboard resource of client device 102. However, because the tenant administrator configured browser security policy parameters 116 to include a policy that does not allow clipboard actions for the user, the user's attempt is blocked and the user cannot extract or inject any sensitive data from or into web page 110. In this regard, clipboard actions may include browser based rendering of UI script-code snippet 112, where UI script-code snippet 112 is not rendered by server device 104. There is no interaction needed between client device 102 and server device 104 or proxy device 106 to perform the blocking of the copy and paste attempt. Instead, client device 102 is configured to perform client side monitoring and session control during the rendering of UI script-code snippet 112 by browser 108. However, such client side monitoring and governance processes may severely affect performance of generating a user interface (UI) in browser 108 based on the local rendering process.

Script-code snippet manager 114 is configured to provide an improved level of performance in generating a user interface in such a monitored web page 110 of browser 108, and also in unmonitored configurations of web page 110 of browser 108. The performance improvement method includes the repeated use of an output value for a user interface that is generated by a single execution of script-code snippet 112. The output value is utilized in one or more subsequent user interface generating processes in web page 110 by browser 108. For example, some rendering code flows (e.g., including UI script-code snippet 112) of browser 110 may be repeated over and over again when rendering web page 110 or when rendering different parts of web page 110 as a result of user input actions received via web page 110. The repeated code flows may occur during a single session of browser 108 or over multiple sessions (e.g., after web page 110 is closed and reloaded). A series of cacheable memory layers are configured to capture and return an executed UI script-code snippet 112 output value (i.e., a rendered UI script-code snippet 112 output value) for reuse in repeated user interface generating processes in web page 110.

In some embodiments, when script-code snippet 112 has been selected for a rendering process, script-code snippet manager 114 is configured to detect whether UI script-code snippet 112 has been previously executed. If it has previously been executed, script-code snippet manager 114 is configured to retrieve a stored output value of the previously executed script-code snippet 112 from one of the cacheable layers and use it to generate a user interface or a portion of a user interface of web page 110. The retrieved output value of UI script-code snippet 112 may be utilized to generate the user interface immediately, rather than having to first execute (or render) UI script-code snippet 112 and then generate the user interface. Using the retrieved output value repeatedly, may be much faster than having to execute the UI script-code snippet each time it is called. In this manner, the number of rendering processes and associated latency in a browser session, or in multiple sessions, may be reduced to the number of unique renderings, where repeated rendering processes are eliminated or reduced in number. For example, if a browser would normally render UI script-code snippet 112 500 times in a session of browser 108, browser 108 is configured to take the time to execute UI script-code snippet 112 once, and store an output value of the execution. For the remaining 499 uses of UI script-code snippet 112, script-code snippet manager 114 is configured to respond to an event by retrieving the stored output value of script-code snippet 112 for use in generating a user interface in web page 110, and avoid the execution time latency.

During the browser-based rendering, for example, when UI script-code snippet 112 is selected for execution based on an event in web page 110, a chain of command of script-code snippet manager 114 may search through layers of memory until the output value from a previous rendering of script-code snippet 112 is found. If the output value is not found in the memory layers, script-code snippet manager 114 is configured to control execution of the script-code snippet to generate the output value for generating a user interface in web page 110 in response to the selection of UI script-code snippet 112 for execution. For example, browser 108 itself may respond by executing UI script-code snippet 112, or script-code snippet manager 114 is configured to decide to send UI script-code snippet 112 to server device 104 for execution, and server device 104 is configured to return the output of execution. Output of the execution of UI script-code snippet 112 by browser 108 or server device 104, in response to the selection of UI script-code snippet 112 for execution, may be used to generate a user interface of web page 110, and may be stored in the layers of memory for future use in generating the user interface of web page 110.

Figure 2:
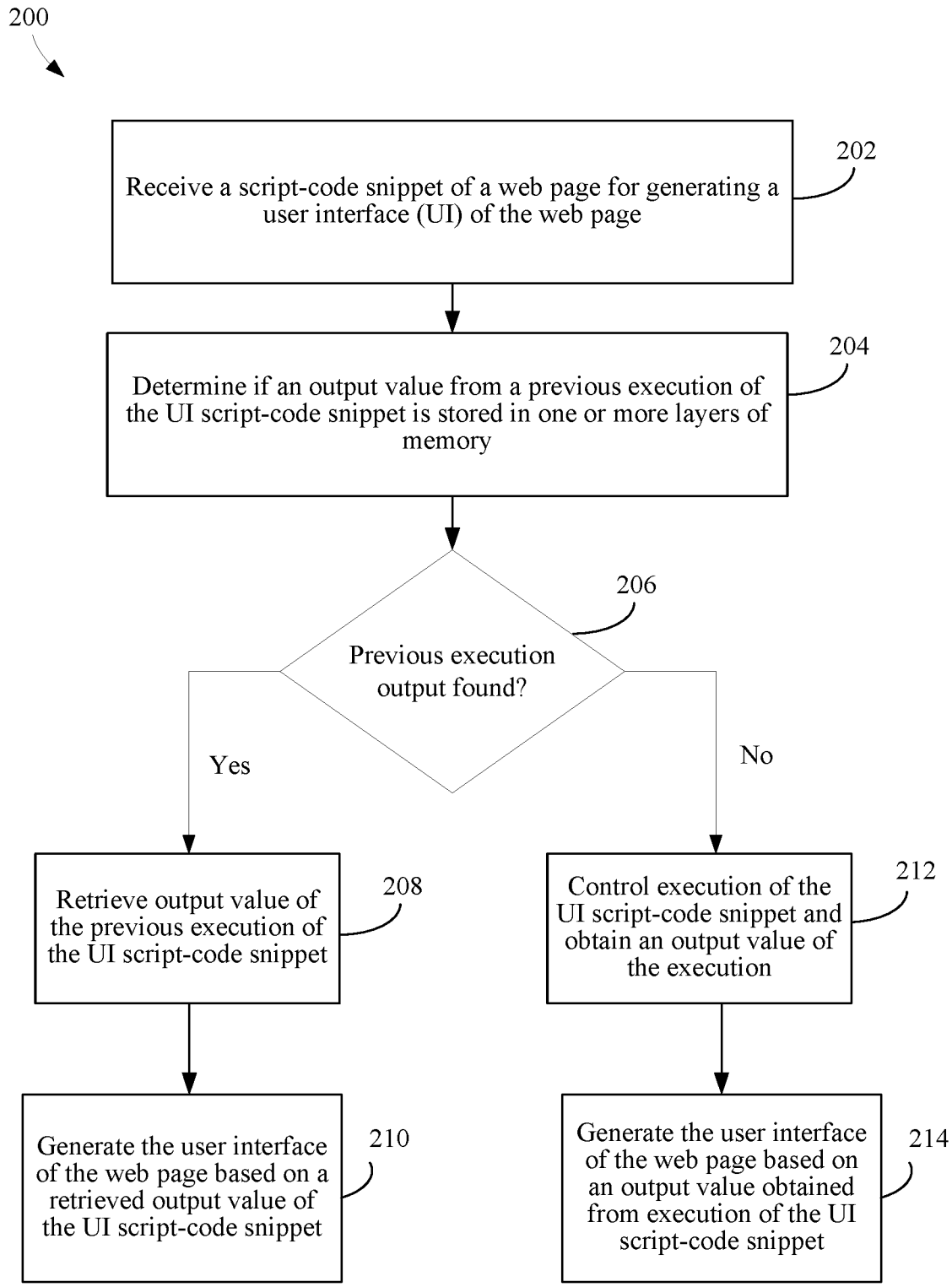
FIG. 2 is a flowchart of a method for saving output values of executed user interface script-code snippets in layers of memory for subsequent reuse, according to an example embodiment.

In embodiments, system 100 may operate in various ways to perform its functions. For example, FIG. 2 is a flowchart 200 of a method for saving output values of executed user interface script-code snippets in layers of memory for subsequent reuse, according to an example embodiment. In one embodiment, flowchart 200 may be performed by browser 108 of client device 102. For the purpose of illustration, flowchart 200 of FIG. 2 is described as follows with reference to FIG. 1.

Flowchart 200 of FIG. 2 begins with step 202. In step 202, a script-code snippet of a web page is received for generating a user interface of the web page. For example, browser 108 of client device 102 may receive UI script-code snippet 112 of web page 110 for generating a user interface in web page 110. UI script-code snippet 112 may be received in response to an event in web page 110 (e.g., a user input received via web page 110 to request a function or an action). Browser 108 may be configured to render or execute UI script-code snippet 112. Operation proceeds to step 204.

In step 204, it is determined whether an output value from a previous execution of the UI script-code snippet is stored in one or more layers of memory. For example, UI script-code snippet 112 may have been previously executed (i.e., rendered) for use in browser 108 and/or web page 110. Script-code snippet manager 114 may search for output from the prior execution of script code snippet 112 in one or more layers of memory of client device 102. Operation proceeds to step 206.

In step 206, in instances where an output value of a previous execution of the UI script-code snippet is found to be stored in the one or more layers of memory, the flow of steps proceeds to step 208. For example, the flow proceeds to step 208 when script-code snippet manager 114 finds that an output value of previous execution of UI script-code snippet 112 has been stored in the one or more layer of memory of client device 102.

In step 208, the output value of the previous execution of the UI script-code snippet is retrieved. For example, browser 108 may retrieve the output value of the previous execution of UI script-code snippet 112 from memory of client device 102. Operation proceeds to step 210.

In step 210, the user interface of the web page is generated based on a retrieved output value of the UI script-code snippet. For example, browser 108 may generate a user interface of web page 110 using an output value of UI script-code snippet 112 where the output value is retrieved by browser 108 from a memory layer of client device 102. Operation of flowchart 200 is finished at step 210.

Referring back to step 206, in instances where an output value of a previous execution of the UI script-code snippet is not found to be stored in the one or more layers of memory, the flow of steps proceeds to step 212. For example, the flow proceeds to step 212 when script-code snippet manager 114 does not find an output value of UI script-code snippet 112 stored in the one or more layer of memory of client device 102.

In step 212, execution of the UI script-code snippet is controlled and an output value of the execution is obtained. In one embodiment, browser 108 may execute (i.e., render) UI script-code snippet 112. In another embodiment, script-code snippet manager 114 may determine that the execution of UI script-code snippet 112 should by handled by server device 104. Browser 108 may transmit UI script-code snippet 112 to server device 104 for execution, and may receive the output value of the execution from server device 104. Operation proceeds to step 214.

In step 214, the user interface of the web page is generated based on an output value obtained from execution of the UI script-code snippet. For example, browser 108 may generate a user interface of web page 110 using an output value obtained from execution of UI script-code snippet 112 performed by browser 108 or performed by server device 104. Operation of flowchart 200 is finished at step 214.

Embodiments of the present disclosure for improving performance in client side browser-based rendering of user interface script-code snippets may be implemented in various ways. For instance, FIG. 3 is a block diagram of a system 300 comprising a client device including a browser that saves output values of executed user interface script-code snippets in layers of memory for subsequent reuse, according to an example embodiment.

Figure 3:
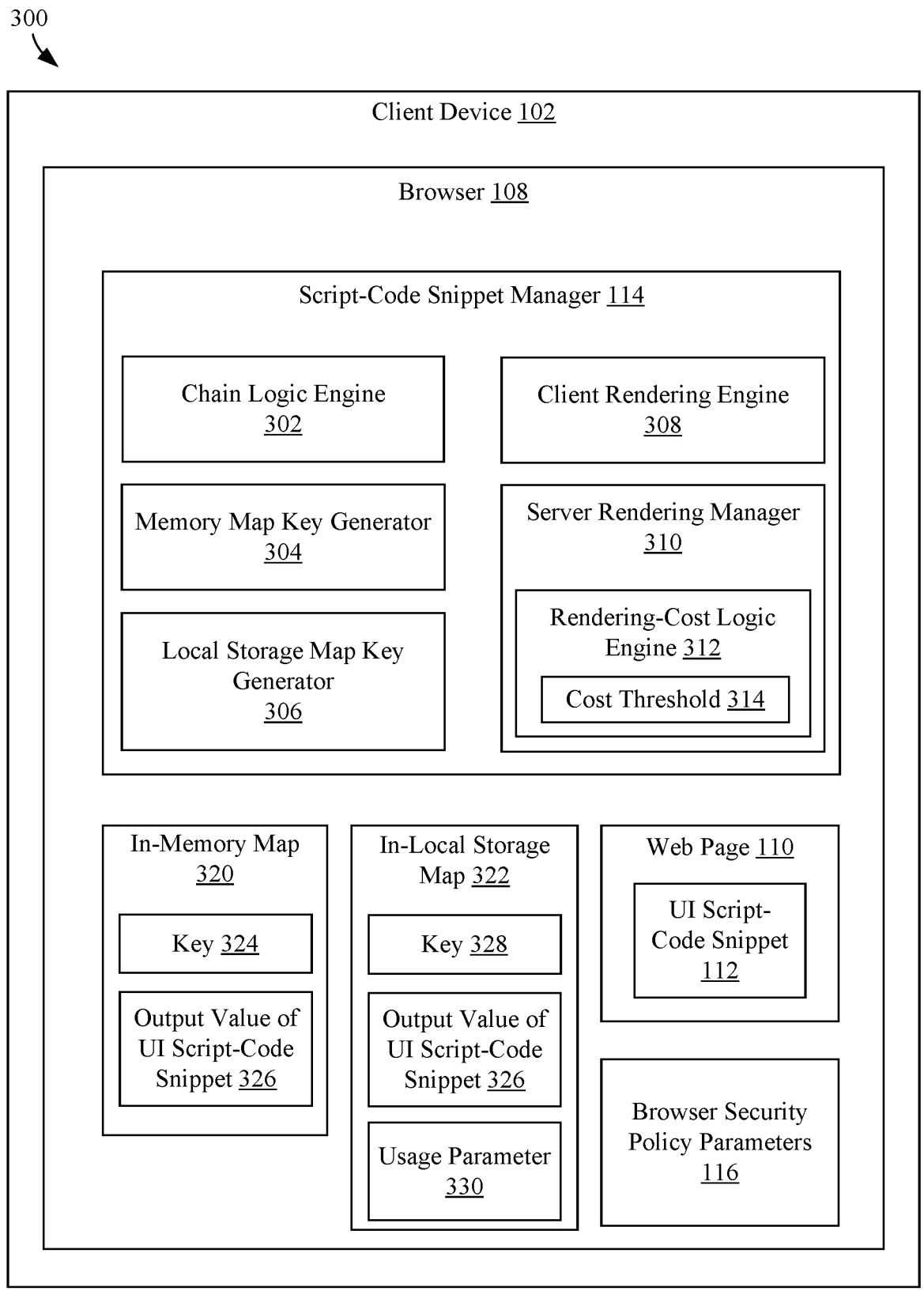
FIG. 3 is a block diagram of a system comprising a client device including a browser that saves output values of executed user interface script-code snippets in layers of memory for subsequent reuse, according to an example embodiment.

As shown in FIG. 3, a system 300 includes client device 102. Client device 102 includes browser 108, script-code snippet manager 114, an in-memory map 320, an in-local storage map 322, web page 110, and browser security policy parameters 116. Script-code snippet manager 114 includes a chain logic engine 302, a memory map key generator 304, a local storage map key generator 306, a client rendering engine 308, and a server rendering manager 310. Server rendering manager 310 includes a rendering-cost logic engine 312, and a cost threshold 314. In-memory map 320 includes key 324 and output value of UI script-code snippet 326. In-local storage map 322 includes key 328, output value of UI script-code snippet 326, and a usage parameter 330. Web page 110 includes UI script-code snippet 112. System 300 is described in further detail as follows.

In general, browser 108 is configured to receive UI script-code snippet 112 of web page 110 for generating a user interface of web page 110. UI script-code snippet 112 may be received in response to an event in web page 110 (e.g., a user input received via web page 110 to request a function or an action). Browser 108 is configured to execute (i.e., render) UI script-code snippet 112 to generate output value of UI script-code snippet 326. Browser 108 is configured to generate the user interface of web page 110 (e.g., a region of web page 110) using output value of UI script-code snippet 326. Browser 108 may store output value of UI script-code snippet 326 in in-memory map 320 and/or in-local storage map 322. As described above, browser 108 is configured to receive input for executing UI script-code snippet 112 of web page 110 multiple times during a browser session, or multiple times over multiple browser sessions for generating the user interface in web page 110. In some embodiments, browser 108 may transmit UI script-code snippet 112 to server device 104 for execution, receive output value of UI script-code snippet 326 from server device 104, and proceed to generate the user interface of web page 110 as described above.

In some embodiments, a current session of web page 110, or browser 108, is a client side monitored session. UI script-code snippet 112 may comprise some aspect of web page 110 (e.g., clipboard actions, printing actions, download or upload actions, etc.) that are to be monitored in browser 108 based on browser security policy parameters 116. The execution of UI script-code snippet 112 may translate or transform UI script-code snippet 112 to output value of UI script-code snippet 326, which may include code for monitoring and enforcing browser policies. For example, once UI script-code snippet 112 is executed, output value of UI script-code snippet 326 may be configured to enforce browser security policy parameters 116 that pertain to actions performed in website 110 as a result of UI script-code snippet 112 code (e.g., clipboard policies, print policies, download or upload policies, etc.). However, the present disclosure is not limited to client side monitored sessions, and in some embodiments, UI script-code snippet 112 is unmanaged and is not monitored in client device 102.

In-memory map 320 is configured to store key 324 as an index to output value of UI script-code snippet 326. For example, in-memory map 320 may comprise an array of keys and values (e.g., in-memory map 326=[{KEY:X, VALUE:Y}, {KEY:X, VALUE:Y}, {KEY:X, VALUE:Y}]), where the values of Y comprise executed (i.e., rendered) code snippets. In order to store or retrieve values from in-memory map 320, memory map key generator 304 is configured to process each code snippet (e.g., UI script-code snippet 112) to generate a unique corresponding key (e.g., key 324). In some embodiments, memory map key generator 304 is configured to use a hashing function to generate key 324 (e.g., key 324=hash (UI script-code snippet 112)). After UI script-code snippet 112 has been executed, script-code snippet manager 114 is configured to store output value of UI script-code snippet 326 in in-memory map 320 using key 324 as an index. Also, chain logic engine 302 may utilize key 324 (e.g., generated by memory map key generator 304) to search for output value of UI script-code snippet 326 in in-memory map 320. In some embodiments, browser 108 is configured to clear in-memory map 320 after each browser 108 session or each time web site 110 is exited or loaded.

In some embodiments, the same keys (e.g., key 324) are used for storing (or retrieving) output value of UI script-code snippet 326 to (or from) in-memory map 320 and in-local storage map 322. Alternatively, the two maps may be different and different keys may be generated for each of them. In other words, key 324 may be the same or different than key 328. For example, similar to the method described above for in-memory map 320, in-local storage map 322 is configured to store key 328 as an index to output value of UI script-code snippet 326. In-local storage map 322 may also store usage parameter 330 to indicate how long to retain (i.e., persist) output value of UI script-code snippet 326 in in-local storage map 322. In this regard, in-local storage map 322 (or one or more elements of in-local storage map 322) may be persistent over multiple browser 108 sessions, after exiting and/or reloading web page 110, or after reboot of client device 102. Each time script-code snippet manager 114 stores or retrieves output value of UI script-code snippet 326 in in-local storage map 322, script-code snippet 114 is configured to update usage parameter 330. For example, usage parameter 330 may indicate the last time output value of UI script-code snippet 326 was accessed or how frequently it is accessed. In-local storage map 322 may comprise an array of keys, values, and corresponding usage parameters (e.g., in-local storage map 322=[{KEY:X, VALUE:Y, PARAMETER: Z}, {KEY:X, VALUE:Y, PARAMETER: Z}, {KEY: X, VALUE: Y, PARAMETERZ}]), where values of Y comprise executed code snippets (e.g., output value of UI script-code snippet 326). Usage parameter 330 may correspond to key 328 and output value of UI script-code snippet 326 in the array of in-local storage map 322 (e.g., {KEY:KEY 328, VALUE:OUTPUT VALUE OF UI SCRIPT-CODE SNIPPET 326, PARAMETER:USAGE PARAMETER 330}). In order to store or retrieve values from in-local storage map 322, local storage map key generator 306 is configured to process (e.g., hash) each code snippet (e.g., UI script-code snippet 112) to generate a unique corresponding key (e.g., key 328). For example, local storage map key generator 306 is configured to generate key 328, and script-code snippet manager 114 is configured to store output value of UI script-code snippet 326 using key 328 as an index in in-local storage map 322. Also, chain logic engine 302 may utilize key 328 to search for (or store) output value of UI script-code snippet 326 in in-local storage map 320 to reuse output value of UI script-code snippet 326.

As described above, browser 108 is configured to receive UI script-code snippet 112 of web page 110 for generating a user interface of web page 110, in response to an event in web page 110. Chain logic engine 302 of script-code snippet manager 114 may determine whether UI script-code snippet 112 has been previously executed, or if it needs to be executed for generating the user interface of web page 110. For example, in-memory map 320 may be more accessible than in-local storage map 322. Chain logic engine 302 may be configured to first determine whether output value of UI script-code snippet 326 is stored in in-memory map 320. In this regard, memory map key generator 304 may be configured to process UI script-code snippet 112 (e.g., using a hash function) to generate key 324. Chain logic 302 may be configured to scan indices of in-memory map 320 for key 324 to find output value of UI script-code snippet 326. If key 324 is not found, chain logic 302 may be configured to determine whether output value of UI script-code snippet 326 is stored in in-local storage map 322. In this regard, local storage map key generator 306 may be configured to process UI script-code snippet 112 (e.g., using a hash function) to generate key 326. Chain logic 302 may be configured to scan indices of in-local storage map 322 for key 326 to find output value of UI script-code snippet 326. In some embodiments, chain logic 302 may be configured to use the same key for scanning in-memory map 320 and in-local storage map 322. In instances where key 326 is not found in in-local storage map 322, chain logic 302 may be configured to control execution of (e.g., rendering) of UI script-code snippet 112 during the current session.

In instances where output value of UI script-code snippet 326 is not found in in-memory map 320 or in-local storage map 322, chain logic engine 302 is configured to determine that client rendering engine 308 may execute (i.e., render) UI script-code snippet 112 to generate output value of UI script-code snippet 326. For example, client rendering engine 308 is configured to execute UI script-code snippet 112 to output value of UI script-code snippet 326. Browser 108 is configured to generate the UI of web page 110 based on output value of UI script-code snippet 326. Script-code snippet manager 114 is configured to store output value of UI script-code snippet 326 in in-memory map 320 and/or in-local storage map 322 utilizing memory map key generator 304 and/or local storage map key generator 306 respectively, as described above.

Alternatively, or in addition, in instances where output value of UI script-code snippet 326 is not found in in-memory map 320 or in-local storage map 322, server rendering manager 310 may be configured to determine whether execution of UI script-code snippet 112 should be handled by server device 104 rather than browser 108. For example, rendering-cost logic engine 312 is configured to determine a cost of performing the execution of UI script-code snippet 112 and compare the cost to cost threshold 314. In response to the cost having a predetermined relationship to cost threshold 314, server rendering manager 310 is configured to transmit UI script-code snippet 112 to server device 104 for performing the execution of script-code snippet 112 to generate output value of UI script-code snippet 326. Server rendering manager 310 is configured to receive output value of UI script-code snippet 326 from server device 104 and provide it to browser 108. Browser 108 is configured to generate the user interface of web page 110 based on output value of UI script-code snippet 326 received from server device 104. Script-code snippet manager 114 is configured to store output value of UI script-code snippet 326 received from server device 104 in in-memory map 320 and/or in-local storage map 322 utilizing memory map key generator 304 and/or local storage map key generator 306 as described above In instances where chain logic engine 302 scans the indices of in-memory map 320 for key 324 to find output value of UI script-code snippet 326, and finds key 324, browser 108 is configured to retrieve output value of UI script-code snippet 326 from in-memory map 320, and generate the user interface of web page 110 in the current session using the retrieved output value of UI script-code snippet 326 from in-memory map 320.

In instances where chain logic engine 302 scans the indices of in-local storage map 322 for key 326 to find output value of UI script-code snippet 326, and finds key 326, browser 108 is configured to retrieve output value of UI script-code snippet 326 from in-local storage map 322, and generate the user interface of web page 110 in the current session using the retrieved output value of UI script-code snippet 326 from in-local storage map 322. Script-code snippet manager 114 may be configured to store the retrieved output value of UI script-code snippet 326 from in-local storage map 322 in in-memory map 320 utilizing memory map key generator 304, as described above.

Generating the user interface of web page 110 based on the retrieved output value of the UI script-code snippet 326 from in-memory map 320 or from in-local storage map 322 is performed faster than generating the user interface based on execution of UI script-code snippet 112 by client rendering engine 308 or by server device 104.

In some embodiments, in response to an initial rendering of web page 110 in a browser session, browser 108 is configured to purge some of the old data from in-local storage map 322 for a user of web page 110 to make storage available for storing additional output values of UI script-code snippets 326 for the user. For example, browser 108 may clean data from in-local storage map 322 based on usage parameters 330. In local-storage 322 may not be completely emptied because it retains some past values that were saved from prior sessions. In general, keys and output values may enter and exit in-local storage map 322 according to the usage of particular users. For example, if a user accesses a certain application or report more often, script-code snippet output values from that report will be retained in in-local storage map 322, and browser 108 may respond faster at generating a user interface of a web page for this report. If a second user accesses another report more often, an in-local storage map for that user will retain script-code snippet output values from the other report, enabling a faster generation of a user interface of the other report for the second user. In this manner each user will have a customized performance improvement according to their usage characteristics.

Figure 4:
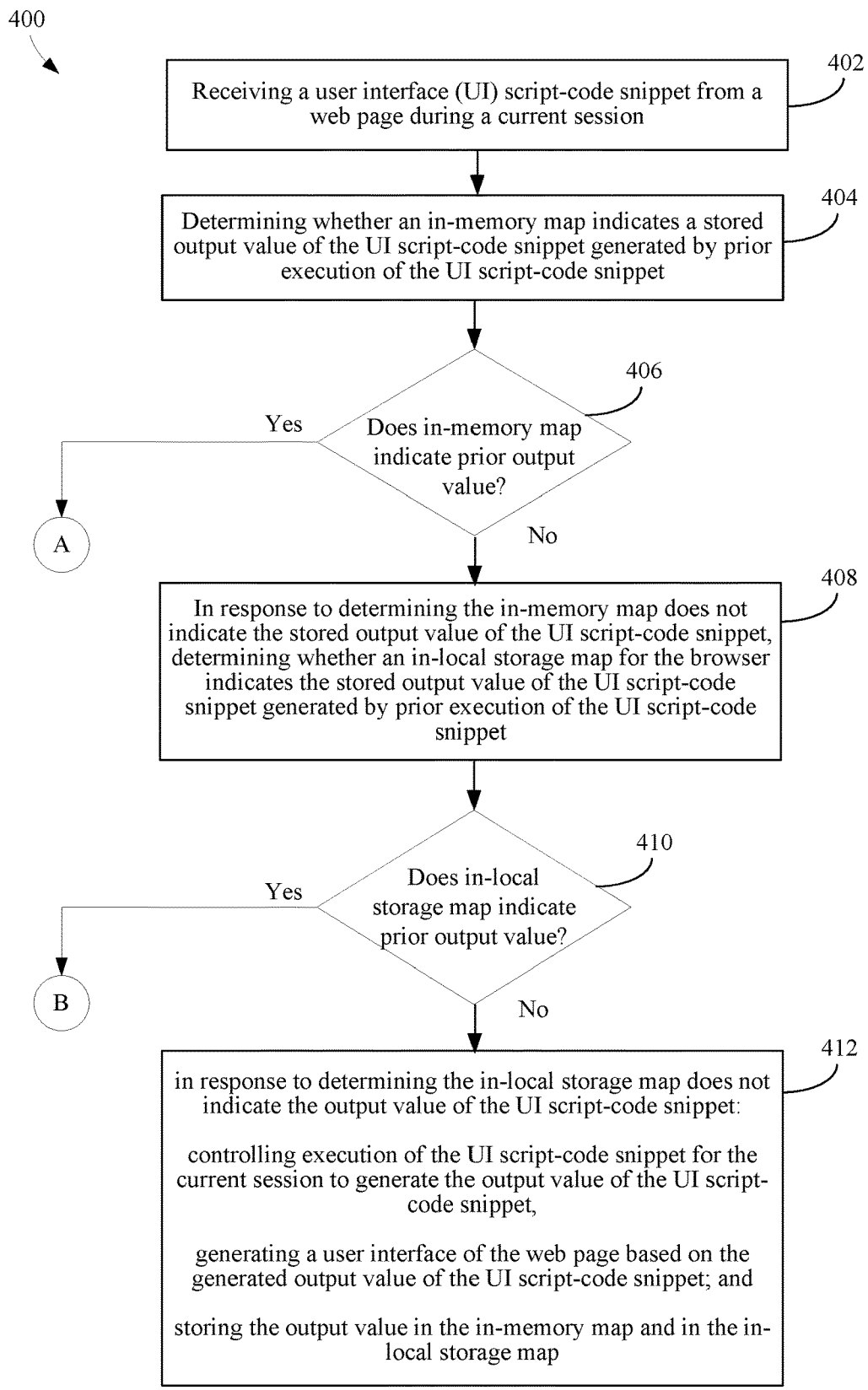
FIG. 4 is a flowchart of a method for saving output values of executed user interface script-code snippets in layers of memory for subsequent reuse, according to an example embodiment.

In embodiments, systems 100 and 300 may operate in various ways to perform their functions. For example, FIG. 4 is a flowchart 400 of a method for saving output values of executed user interface script-code snippets in layers of memory for subsequent reuse, according to an example embodiment. Flowchart 400 may be performed by browser 108 of FIGS. 1 and 3. For purposes of illustration, flowchart 400 of FIG. 4 is described with reference to FIG. 3.

Flowchart 400 of FIG. 4 begins with step 402. In step 402, a user interface (UI) script-code snippet is received from a web page during a current session. For example, browser 108 receives UI script-code snippet 112 from web page 110 during a current session. UI script-code snippet 112 may be received in response to an event in web page 110 (e.g., a user input received via web page 110 to request a function or an action). Operation proceeds to step 404.

In step 404, it may be determined whether an in-memory map indicates a stored output value of the UI script-code snippet generated by prior execution of the UI script-code snippet. For example, chain logic engine 302 may determine whether in-memory map 320 indicates a stored output value of the UI script-code snippet 326 generated by prior execution of UI script code snippet 112. Chain logic 302 may scan in-memory map 320 for output value of UI script-code snippet 326. Operation proceeds to step 406.

In step 406, in instances where in-memory map 320 does not indicate prior output value of UI script-code snippet 326, the processing flow proceeds to step 408. For example, if chain logic engine 302 does not find output value of UI script-code snippet 326 stored in in-memory map 320, the processing flow proceeds to step 408.

In step 408, in response to determining the in-memory map does not indicate the stored output value of the UI script-code snippet, it may be determined whether an in-local storage map for the browser indicates the stored output value of the UI script-code snippet generated by prior execution of the UI script-code snippet. For example, chain logic 302 may determine whether in-local storage map 322 indicates output value of UI script-code snippet 326 generated by prior execution of UI script-code snippet 112. Chain logic 302 may search for output value of UI script-code snippet 326 in in-local storage map 322. Operation proceeds to step 410.

In step 410, in instances when in-local storage map 322 does not indicate prior output value of UI script-code snippet 326, the processing flow proceeds to step 412. For example, if chain logic engine 302 does not find output value of UI script-code snippet 326 stored in in-local storage map 322, the processing flow proceeds to step 412

In step 412, in response to determining the in-local storage map does not indicate the output value of the UI script-code snippet, execution of the UI script-code snippet is controlled in the current session to generate the output value of the UI script-code snippet. A user interface of the web page is generated based on the generated output value of the UI script-code snippet 326. The output value may be stored in the in-memory map and in the in-local storage map. For example, in instances where chain logic engine 302 does not find output value of UI script-code snippet 326 stored in in-local storage map 322, chain logic engine 302 may control rendering engine 308 to execute (i.e., render) UI script-code snippet 112 to generate output value of UI script-code snippet 326. Browser 108 may generate the UI of web page 110 based on output value of UI script-code snippet 326 from rendering engine 308. In some embodiments, script-code snippet manager 114 is configured to store output value of UI script-code snippet 326 generated by rendering engine 308 in in-memory map 320 and/or in-local storage map 322, for example, utilizing memory map key generator 304 and/or local storage map key generator 306 respectively as described above. Operation of flowchart 400 is finished at step 412.

Figure 5:
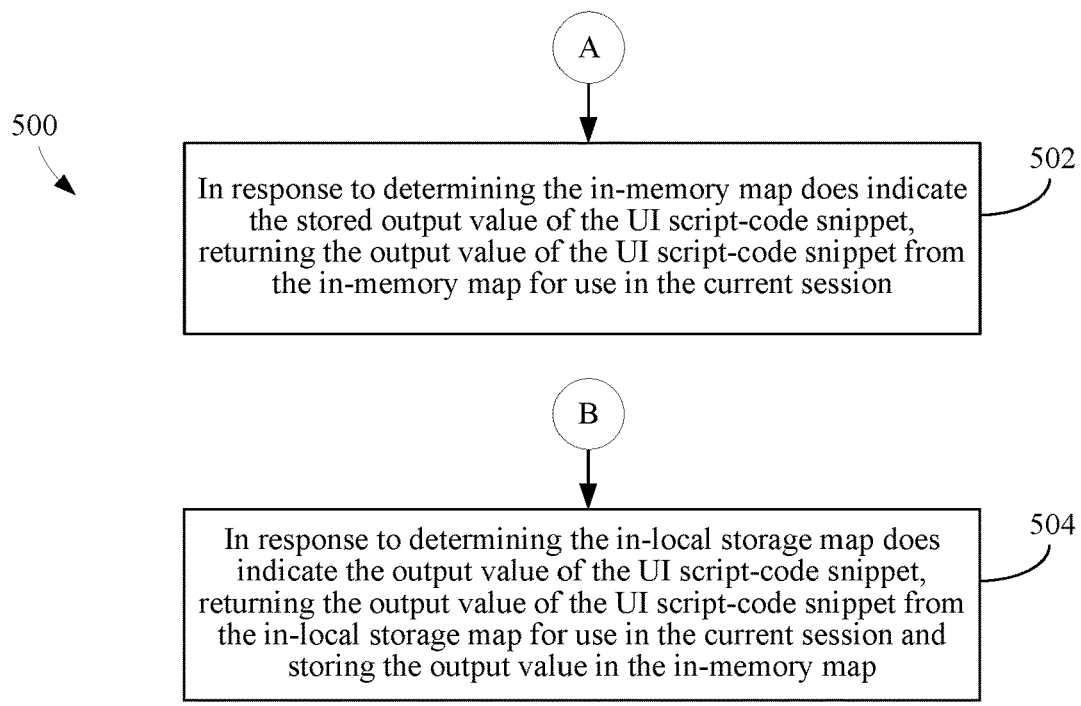
FIG. 5 is a flowchart of a method for utilizing a previously executed UI script code snippet from a layer of memory for generating a user interface of a web page, according to an example embodiment.

Alternatively, or in addition, in instances where output value of UI script-code snippet 326 is not found in-memory map 320 or in-local storage map 322, server rendering manager 310 may transmit UI script-code snippet 112 to server device 104 for performing the execution of script-code snippet 112 to generate output value of UI script-code snippet 326. Server rendering manager 310 may receive output value of UI script-code snippet 326 from server device 104 and provide it to browser 108. Browser 108 may generate the UI of web page 110 based on output value of UI script-code snippet 326 received from server device 104. Script-code snippet manager 114 may store output value of UI script-code snippet 326 received from server device 104 in in-memory map 320 and/or in-local storage map 322, for example, utilizing memory map key generator 304 and/or local storage map key generator 306 respectively, as described above In embodiments, systems 100 and 300 may operate in various ways to perform their functions. For example, FIG. 5 is a flowchart 500 of a method for utilizing a previously executed UI script code snippet from a layer of memory for generating a user interface of a web page, according to an example embodiment. Flowchart 500 may be performed by browser 108 of FIGS. 1 and 3. For the purposes of illustration, flowchart 500 of FIG. 5 is described with reference to FIGS. 3 and 4.

Flowchart 500 of FIG. 5 begins with step 502. In step 502, in response to determining the in-memory map does indicate the stored output value of the UI script-code snippet, the output value of the UI script-code snippet may be returned from the in-memory map for use in the current session. For example, with reference to step 406 of flowchart 400, in instances where chain logic engine 302 finds that in-memory map 320 does indicate prior output value of UI script-code snippet 326, browser 108 may retrieve output value of UI script-code snippet 326 from in-memory map 320. Browser 108 may generate the user interface of web page 110 in the current session using output value of UI script-code snippet 326 retrieved from in-memory map 320. Operation is finished at step 502.

In step 504, in response to determining the in-local storage map does indicate the output value of the UI script-code snippet, returning the output value of the UI script-code snippet from the in-local storage map for use in the current session and storing the output value in the in-memory map. For example, with reference to step 410 of flowchart 400, in instances where chain logic engine 302 finds that in-local storage map 322 does indicate prior output value of UI script-code snippet 326, browser 108 may retrieve output value of UI script-code snippet 326 from in-local storage map 320. Browser 108 may generate the user interface of web page 110 in the current session using output value of UI script-code snippet 326 retrieved from in-local storage map 320. Script-code snippet manager 114 may store output value of UI script-code snippet 326 from in-local storage map 322 to in-memory map 320, for example, utilizing memory map key generator 304, as described above. Operation is finished at step 504.

Figure 6:
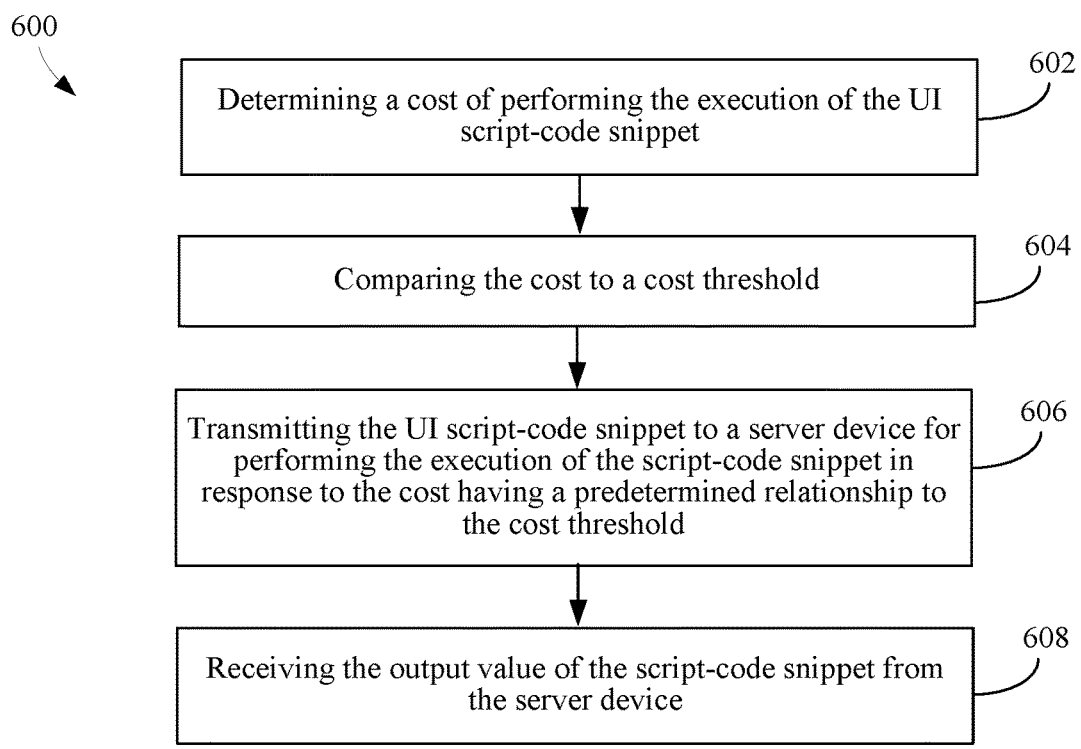
FIG. 6 is a flowchart of a method for transmitting a user interface script-code snippet to a server device for execution of the user interface script-code snippet, according to an example embodiment

In embodiments, systems 100 and 300 may operate in various ways to perform their functions. For example, FIG. 6 is a flowchart 600 of a method for transmitting a UI script-code snippet to a server device for execution of the UI script-code snippet, according to an example embodiment. Flowchart 600 may be performed by browser 108 of FIGS. 1 and 3. For the purposes of illustration, flowchart 600 of FIG. 6 is described with reference to FIG. 3.

Flowchart 600 of FIG. 6 begins with step 602. In step 602, a cost of performing the execution of the UI script-code snippet may be determined. For example, in instances where output value of UI script-code snippet 326 is not found in in-memory map 320 or in-local storage map 322, server rendering manager 310 may determine whether execution of UI script-code snippet 112 should be handled by server device 104 rather than browser 108. Rendering-cost logic engine 312 may determine a cost of performing the execution of UI script-code snippet 112.

In step 604, the cost may be compared to a cost threshold. For example, rendering-cost logic engine 312 may compare the cost of performing the execution of UI script-code snippet 112 to cost threshold 314.

In step 606, the UI script-code snippet may be transmitted to a server for performing the execution of the script-code snippet in response to the cost having a predetermined relationship with a cost threshold. For example, in response to the cost having a predetermined relationship to cost threshold 314, server rendering manager 310 may transmit UI script-code snippet 112 to server device 104. Server device 104 may perform the execution of script-code snippet 112. Server device 104 may execute script-code snippet 112 and generate output value of UI script-code snippet 326.

In step 608, the output value of the script-code snippet may be received from the server device. For example, server rendering manager 310 may receive output value of UI script-code snippet 326 for generation of the user interface of web page 110, as described above.

Figure 7:
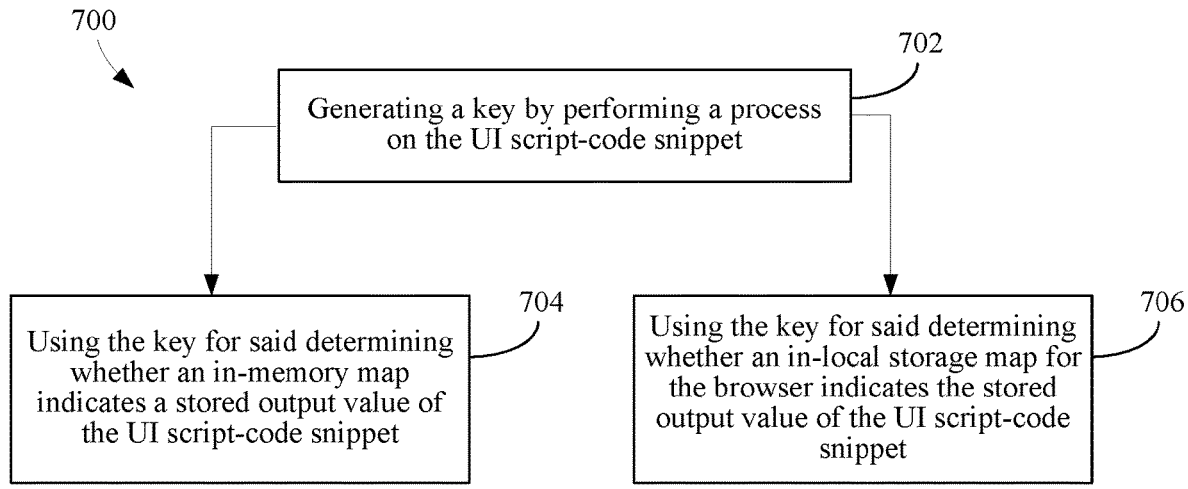
FIG. 7 is a flowchart of a method for generating a key for determining whether one or more layers of memory indicate a stored output value of a user interface script-code snippet, according to an example embodiment.

In embodiments, systems 100 and 300 may operate in various ways to perform their functions. For example, FIG. 7 is a flowchart 700 of a method for generating a key for determining whether one or more layers of memory indicate a stored output value of a user interface script-code snippet, according to an example embodiment. Flowchart 700 may be performed by browser 108 of FIGS. 1 and 3. For the purposes of illustration, flowchart 700 of FIG. 7 is described with reference to FIG. 3.

Flowchart 700 of FIG. 7 begins with step 702. In step 702, a key may be generated by performing a process on the UI script-code snippet. As described above, chain logic 302 may be configured to determine whether in-memory map 320 indicates output value of UI script-code snippet 326 generated by prior execution of UI script-code snippet 112. In-memory map 320 may store key 324 as an index to output value of UI script-code snippet 326. Memory map key generator 304 may generate key 324 by processing script-code snippet 112 (e.g., using a hash function).

Alternatively or in addition, chain logic 302 may be configured to determine whether in-local storage map 322 indicates output value of UI script-code snippet 326 generated by prior execution of UI script-code snippet 112. In-local storage map 322 may store key 328 as an index to output value of UI script-code snippet 326. Local storage map key generator 306 may generate key 328 by processing script-code snippet 112 (e.g., using a hash function).

In step 704, the key may be used for said determining whether an in-memory map indicates a stored output value of the UI script-code snippet. For example, chain logic engine 302 may utilize key 324 to scan for output value of UI script-code snippet 326 in in-memory map 320.

In step 706, the key may be used for said determining whether an in-local storage map for the browser indicates the stored output value of the UI script-code snippet. For example, chain logic engine 302 may utilize key 328 to scan for output value of UI script-code snippet 326 in in-local storage map 322.

In some embodiments, in-memory map 320 and in-local storage map 322 may use the same key values as indices for output value of UI script-code snippet 326. In this embodiment, chain logic 302 may use the same key (e.g., key 324 or key 328) for scanning in-memory map 320 and in-local storage map 322 to find (or store) output value of UI script-code snippet 326.

Figure 8:
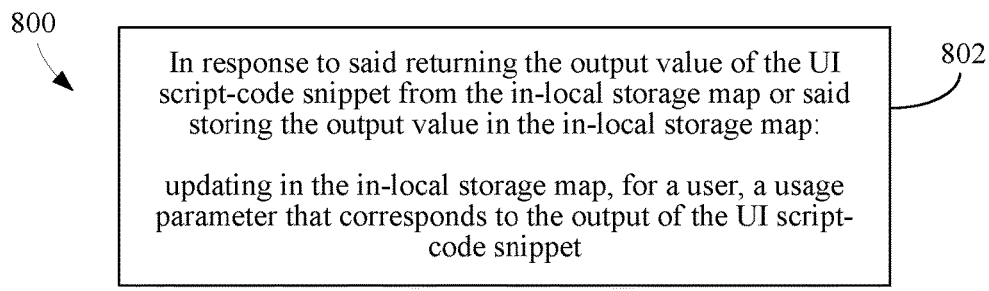
FIG. 8 is a flowchart of a method for maintaining an in-local storage map, according to an example embodiment.

In embodiments, systems 100 and 300 may operate in various ways to perform their functions. For example, FIG. 8 is a flowchart 800 of a method for maintaining data in an in-local storage map, according to an example embodiment. Flowchart 800 may be performed by browser 108 of FIGS. 1 and 3. For the purposes of illustration, flowchart 800 of FIG. 8 is described with reference to FIG. 3.

Flowchart 800 of FIG. 8 includes step 802. In step 802, in response to said returning the output value of the UI script-code snippet from the in-local storage map or said storing the output value in the in-local storage map: update in the in-local storage map, for a user, a usage parameter that corresponds to the output of the UI script-code snippet. For example, in-local storage map 322 may store usage parameter 330 to indicate how long to retain (i.e., persist) output value of UI script-code snippet 326 in the in-local storage map 322. In-local storage map 322 (or one or more elements of in-local storage map 322) may be persistent over multiple browser 108 sessions, after exiting and/or reloading web page 110, or after reboot of client device 102. As described above, in-local storage map 322 may comprise an array of keys, values, and corresponding usage parameters (e.g., in-local storage map 322=[{KEY:X, VALUE:Y, PARAMETER:Z}, {KEY:X, VALUE:Y, PARAMETER:Z}, {KEY:X, VALUE:Y, PARAMETER:Z}]), where values of Y comprise executed code snippets (e.g., output value of UI script-code snippet 326). Usage parameter 330 may correspond to key 328 and output value of UI script-code snippet 326 in the array of in-local storage map 322. Each time script-code snippet manager 114 stores or retrieves output value of UI script-code snippet 326 to or from in-local storage map 322, script-code snippet 114 may update usage parameter 330. For example, usage parameter 330 may indicate the last time output value of UI script-code snippet 326 was stored or accessed, or how frequently it has been accessed.

Figure 9:
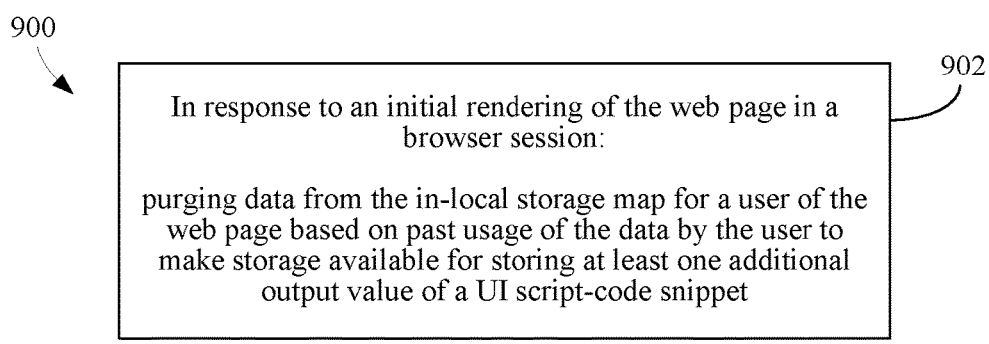
FIG. 9 is a flowchart of a method for maintaining data in an in-local storage map, according to an example embodiment.

In embodiments, systems 100 and 300 may operate in various ways to perform their functions. For example, FIG. 9 is a flowchart 900 of a method for maintaining data in an in-local storage map, according to an example embodiment. Flowchart 900 may be performed by browser 108 of FIGS. 1 and 3. For the purposes of illustration, flowchart 900 of FIG. 9 is described with reference to FIG. 3.

Flowchart 900 of FIG. 9 includes step 902. In step 902, in response to an initial rendering of the web page in a browser session: data may be purged from the in-local storage map for a user of the web page based on past usage of the data by the user to make storage available for storing at least one additional output value of a UI script-code snippet. For example, in response to an initial rendering of web page 110 and/or exiting web page 110, browser 108 is configured to purge old data from in-local storage map 322 for a user of web page 110, to make storage available for storing additional output values of the UI script-code snippets 326. For example, browser 108 may clean in-local storage map 322 based on usage parameters 330. However, in local-storage 322 may not be completely emptied because it may retain some past values (e.g., keys, values, and parameters) that were saved from prior sessions for use in future sessions. In general, keys, output values, and/or parameters may be added to, or removed from, in-local storage map 322 according to the usage of particular users so that each user will have a customized performance improvement according to their usage characteristics.

III. Example Computer System Implementation

Embodiments described herein may be implemented in hardware, or hardware combined with software and/or firmware. For example, embodiments described herein may be implemented as computer program code/instructions configured to be executed in one or more processors and stored in a computer readable storage medium. Alternatively, embodiments described herein may be implemented as hardware logic/electrical circuitry.

As noted herein, the embodiments described, including but not limited to, system 100 of FIG. 1 and system 300 of FIG. 3 along with any components and/or subcomponents thereof, as well any operations and portions of flowcharts/flow diagrams described herein and/or further examples described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), an application specific integrated circuit (ASIC), a trusted platform module (TPM), and/or the like. A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Embodiments described herein may be implemented in one or more computing devices similar to a mobile system and/or a computing device in stationary or mobile computer embodiments, including one or more features of mobile systems and/or computing devices described herein, as well as alternative features. The descriptions of computing devices provided herein are provided for purposes of illustration, and are not intended to be limiting. Embodiments may be implemented in further types of computer systems, as would be known to persons skilled in the relevant art(s).

Figure 10:
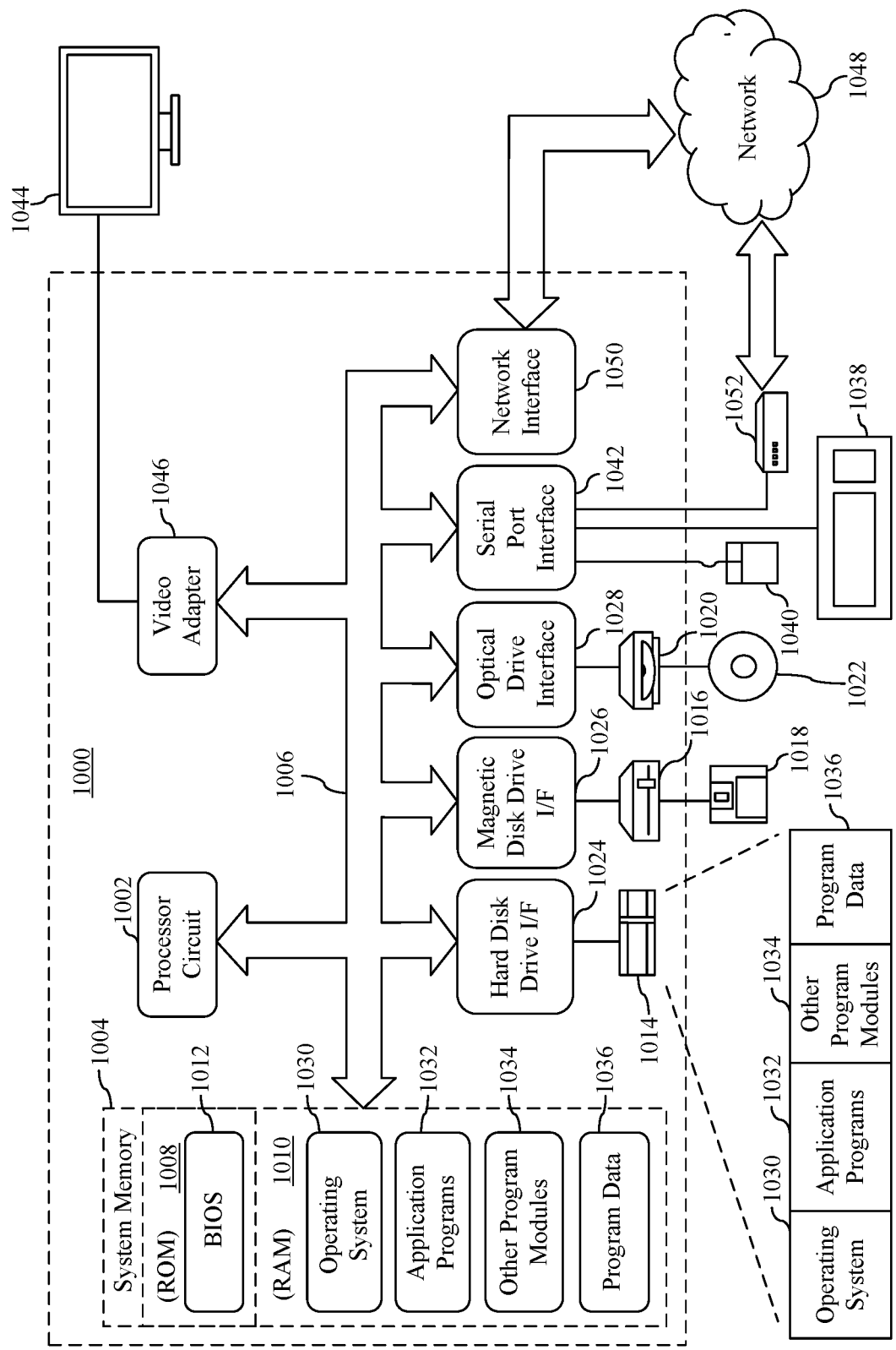
FIG. 10 is a block diagram of an example processor-based computer system that may be used to implement various embodiments.

FIG. 10 is a block diagram of an example processor-based computer system 1000 that may be used to implement various embodiments. Client device 102, server device 104, and proxy server 106 may each include any type of computing device, mobile or stationary, such as a desktop computer, a server, a video game console, etc. For example, any of client device 102, server device 104, and proxy server 106 may be any type of mobile computing device (e.g., a Microsoft® Surface® device, a personal digital assistant (PDA), a laptop computer, a notebook computer, a tablet computer such as an Apple iPad™, a netbook, etc.), a mobile phone (e.g., a cell phone, a smart phone such as a Microsoft Windows® phone, an Apple iPhone, a phone implementing the Google® Android™ operating system, etc.), a wearable computing device (e.g., a head-mounted device including smart glasses such as Google® Glass™, Oculus Rift® by Oculus VR, LLC, etc.), a stationary computing device such as a desktop computer or PC (personal computer), a gaming console/system (e.g., Microsoft Xbox®, Sony PlayStation®, Nintendo WHO or Switch®, etc.), etc.

Client device 102, server device 104, and proxy server 106 may each be implemented in one or more computing devices containing features similar to those of computing device 1000 in stationary or mobile computer embodiments and/or alternative features. The description of computing device 1000 provided herein is provided for purposes of illustration, and is not intended to be limiting. Embodiments may be implemented in further types of computer systems, as would be known to persons skilled in the relevant art(s).

As shown in FIG. 10, computing device 1000 includes one or more processors, referred to as processor circuit 1002, a system memory 1004, and a bus 1006 that couples various system components including system memory 1004 to processor circuit 1002. Processor circuit 1002 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1002 may execute program code stored in a computer readable medium, such as program code of operating system 1030, application programs 1032, other programs 1034, etc. Bus 1006 represents one or more of any of several types of bus structures, including a memory bus or memory controller, a peripheral bus, an accelerated graphics port, and a processor or local bus using any of a variety of bus architectures. System memory 1004 includes read only memory (ROM) 1008 and random-access memory (RAM) 1010. A basic input/output system 1012 (BIOS) is stored in ROM 1008.

Computing device 1000 also has one or more of the following drives: a hard disk drive 1014 for reading from and writing to a hard disk, a magnetic disk drive 1016 for reading from or writing to a removable magnetic disk 1018, and an optical disk drive 1020 for reading from or writing to a removable optical disk 1022 such as a CD ROM, DVD ROM, or other optical media. Hard disk drive 1014, magnetic disk drive 1016, and optical disk drive 1020 are connected to bus 1006 by a hard disk drive interface 1024, a magnetic disk drive interface 1026, and an optical drive interface 1028, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1030, one or more application programs 1032, other programs 1034, and program data 1036. Application programs 1032 or other programs 1034 may include, for example, computer program logic (e.g., computer program code or instructions) for implementing client device 102, server device 104, proxy server 106, website 120, monitored reflection generator 130, browser 108, web page 110, script-code snippet manager 114, chain logic engine 302, memory map key generator 304, local storage map key generator 306, client rendering engine 308, server rendering manager 310, rendering-cost logic engine 312, in-memory map 320, in-local storage map 322, flowcharts 200, 400, 500, 600, 700, 800, 900, and/or further embodiments described herein. Program data 1036 may include tenant configuration parameters 122, security policy parameters 132, UI script-code snippet 112, browser security policy parameters 116, cost threshold 314, in-memory map 320, in-local storage map 322, key 324, key 328, output value of UI script-code snippet 326, usage parameter 330, and/or further embodiments described herein.

A user may enter commands and information into computing device 1000 through input devices such as keyboard 1038 and pointing device 1040. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1002 through a serial port interface 1042 that is coupled to bus 1006, but may be connected by other interfaces, such as a parallel port, game port, or a universal serial bus (USB).

A display screen 1044 is also connected to bus 1006 via an interface, such as a video adapter 1046. Display screen 1044 may be external to, or incorporated in computing device 1000. Display screen 1044 may display information, as well as being a user interface for receiving user commands and/or other information (e.g., by touch, finger gestures, virtual keyboard, etc.). In addition to display screen 1044, computing device 1000 may include other peripheral output devices (not shown) such as speakers and printers.

Computing device 1000 is connected to a network 1048 (e.g., the Internet) through an adaptor or network interface 1050, a modem 1052, or other means for establishing communications over the network. Modem 1052, which may be internal or external, may be connected to bus 1006 via serial port interface 1042, as shown in FIG. 10, or may be connected to bus 1006 using another interface type, including a parallel interface.

As used herein, the terms "computer program medium," "computer-readable medium," and "computer-readable storage medium" are used to refer to physical hardware media such as the hard disk associated with hard disk drive 1014, removable magnetic disk 1018, removable optical disk 1022, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1032 and other programs 1034) may be stored on the hard disk, magnetic disk, optical disk, ROM, RAM, or other hardware storage medium. Such computer programs may also be received via network interface 1050, serial port interface 1042, or any other interface type. Such computer programs, when executed or loaded by an application, enable computing device 1000 to implement features of embodiments discussed herein. Accordingly, such computer programs represent controllers of computing device 1000.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Examples and Advantages

In an embodiment, a system in a browser in a client device comprises a script-code snippet manager that is configured to receive a user interface (UI) script-code snippet from a web page during a current session. The script-code snippet manager comprises a chain logic engine configured to determine whether an in-memory map indicates a stored output value of the UI script-code snippet generated by prior execution of the UI script-code snippet. In response to determining the in-memory map does not indicate the stored output value of the UI script-code snippet, the script-code snippet manager determines whether an in-local storage map for the browser indicates the stored output value of the UI script-code snippet generated by prior execution of the UI script-code snippet. In response to determining the in-local storage map does not indicate the output value of the UI script-code snippet, the script-code snippet manager is further configured to control execution of the UI script-code snippet for the current session to generate the output value of the UI script-code snippet, and store the output value in the in-memory map and in the in-local storage map.

In an embodiment of the foregoing system, the chain logic engine is further configured to: in response to determining the in-memory map does indicate the stored output value of the UI script-code snippet, return the output value of the UI script-code snippet from the in-memory map for use in the current session; or in response to determining the in-local storage map does indicate the output value of the UI script-code snippet, return the output value of the UI script-code snippet from the in-local storage map for use in the current session and storing the output value in the in-memory map.

In an embodiment of the foregoing system the browser is configured to: retrieve the output value of the UI script-code snippet indicated by the in-memory map or the in-local storage map; and generate a user interface of the web page based on the retrieved output value of the UI script-code snippet. The retrieved output value of the UI script-code snippet comprises a prior executed portion of the web page. Said generate a user interface of the web page based on the retrieved output value of the UI script-code snippet is performed faster than generating the user interface based on said control execution of the UI script-code snippet for the current session to generate the output value of the script-code snippet.

In an embodiment of the foregoing system, the execution of the UI script-code snippet is performed by the browser.

In an embodiment of the foregoing system, the system further comprises a rendering-cost logic engine configured to: determine a cost of performing the execution of the UI script-code snippet; and compare the cost to a cost threshold. The server rendering manager configured to: transmit the UI script-code snippet to a server device for performing the execution of the script-code snippet in response to the cost having a predetermined relationship to the cost threshold; and receive the output value of the script-code snippet from the server device.

In an embodiment of the foregoing system, the system further comprises a key generator configured to: generate a key by performing a process on the UI script-code snippet and use the key for said determining whether an in-memory map indicates a stored output value of the UI script-code snippet; or use the key for said determining whether an in-local storage map for the browser indicates the stored output value of the UI script-code snippet.

In an embodiment of the foregoing system, wherein the UI script-code snippet is persistently available in the in-local storage map after reloading the web page or after reboot of the client device.

In an embodiment of the foregoing system, wherein the current session of the web page is a client side monitored session.

In an embodiment of the foregoing system, wherein execution of the UI script-code snippet translates the UI script-code snippet to a monitored UI script-code snippet for enforcing security policies by the browser.

In an embodiment of the foregoing system, wherein the script-code snippet manager is further configured to: in response to the return of the output value of the UI script-code snippet from the in-local storage map or the store of the output value in the in-local storage map: update in the in-local storage map, for a user, a usage parameter that corresponds to the output value of the UI script-code snippet.

In an embodiment of the foregoing system, wherein the browser is further configured to: in response to an initial rendering of the web page in a browser session purge data from the in-local storage map for a user of the web page based on past usage of the data by the user to make storage available for storing at least one additional output value of a UI script-code snippet.

In an embodiment, a method in a browser in a client device comprises: receiving a user interface (UI) script-code snippet from a web page during a current session; and determining whether an in-memory map indicates a stored output value of the UI script-code snippet generated by prior execution of the UI script-code snippet. In response to determining the in-memory map does not indicate the stored output value of the UI script-code snippet: determine whether an in-local storage map for the browser indicates the stored output value of the UI script-code snippet generated by prior execution of the UI script-code snippet. In response to determining the in-local storage map does not indicate the output value of the UI script-code snippet: control execution of the UI script-code snippet for the current session to generate the output value of the UI script-code snippet, and store the output value in the in-memory map and in the in-local storage map.

In an embodiment of the foregoing method, in response to determining the in-memory map does indicate the stored output value of the UI script-code snippet, returning the output value of the UI script-code snippet from the in-memory map for use in the current session; or in response to determining the in-local storage map does indicate the output value of the UI script-code snippet, returning the output value of the UI script-code snippet from the in-local storage map for use in the current session and storing the output value in the in-memory map.

In an embodiment of the foregoing method, the method further comprises retrieving the output value of the UI script-code snippet indicated by the in-memory map or the in-local storage map; and generating a user interface of the web page based on the retrieved output value of the UI script-code snippet. The retrieved output value of the UI script-code snippet comprises a prior executed portion of the web page. Said generating a user interface of the web page based on the retrieved output value of the UI script-code snippet is performed faster than generating the user interface based on said controlling execution of the UI script-code snippet for the current session to generate the output value of the script-code snippet.

In an embodiment of the foregoing method, the method further comprises: determining a cost of performing the execution of the UI script-code snippet; comparing the cost to a cost threshold; transmitting the UI script-code snippet to a server device for performing the execution of the script-code snippet in response to the cost having a predetermined relationship to the cost threshold; and receiving the output value of the script-code snippet from the server device.

In an embodiment of the foregoing method, the method further comprises generating a key by performing a process on the UI script-code snippet and: using the key for said determining whether an in-memory map indicates a stored output value of the UI script-code snippet; or using the key for said determining whether an in-local storage map for the browser indicates the stored output value of the UI script-code snippet.

In an embodiment of the foregoing method, the execution of the UI script-code snippet translates the UI script-code snippet to a monitored UI script-code snippet for enforcing security policies by the browser.

In an embodiment, a computer-readable medium having program code recorded thereon that when executed by at least one processor causes the at least one processor to perform a method. The method comprises: receiving a user interface (UI) script-code snippet from a web page during a current session; and determining whether an in-memory map indicates a stored output value of the UI script-code snippet generated by prior execution of the UI script-code snippet. In response to determining the in-memory map does not indicate the stored output value of the UI script-code snippet, determine whether an in-local storage map for the browser indicates the stored output value of the UI script-code snippet generated by prior execution of the UI script-code snippet. In response to determining the in-local storage map does not indicate the output value of the UI script-code snippet: control execution of the UI script-code snippet for the current session to generate the output value of the UI script-code snippet, generate a user interface of the web page based on the generated output value of the UI script-code snippet; and store the output value in the in-memory map and in the in-local storage map.

In an embodiment of the foregoing computer-readable medium, the computer-readable medium further comprises: in response to determining the in-memory map does indicate the stored output value of the UI script-code snippet, returning the output value of the UI script-code snippet from the in-memory map for use in the current session; or in response to determining the in-local storage map does indicate the output value of the UI script-code snippet, returning the output value of the UI script-code snippet from the in-local storage map for use in the current session and storing the output value in the in-memory map.

In the foregoing computer-readable medium, the computer-readable medium further comprises: retrieving the output value of the UI script-code snippet indicated by the in-memory map or the in-local storage map; and generating a user interface of the web page based on the retrieved output value of the UI script-code snippet. The retrieved output value of the UI script-code snippet comprises a prior executed portion of the web page; and said generating a user interface of the web page based on the retrieved output value of the UI script-code snippet is performed faster than generating the user interface based on said controlling execution of the UI script-code snippet for the current session to generate the output value of the script-code snippet.

V. Conclusion

While various embodiments of the present application have been described above, it should be understood that they have been presented by way of example only, and not limitation. It will be understood by those skilled in the relevant art(s) that various changes in form and details may be made therein without departing from the spirit and scope of the application as defined in the appended claims. Accordingly, the breadth and scope of the present application should not be limited by any of the above-described exemplary embodiments, but should be defined only in accordance with the following claims and their equivalents.

What is claimed is:

1. A system in a browser in a client device, comprising:
a processor; and
a memory device, the memory device storing program code to be executed by the processor, the program code comprising:
   a script-code snippet manager that receives a user interface (UI) script-code snippet from a web page during a current session;
   the script-code snippet manager comprising a chain logic engine that:
      determines whether an in-memory map indicates a stored output value of the UI script-code snippet generated by prior execution of the UI script-code snippet; and
      in response to determining the in-memory map does not indicate the stored output value of the UI script-code snippet, determines whether an in-local storage map for the browser indicates the stored output value of the UI script-code snippet generated by prior execution of the UI script-code snippet; wherein
      in response to determining the in-local storage map does not indicate the output value of the UI script-code snippet, the script-code snippet manager further:
         controls execution of the UI script-code snippet for the current session to generate the output value of the UI script-code snippet, and
         stores the output value in the in-memory map and in the in-local storage map.

2. The system of claim 1, wherein the chain logic engine further:
   in response to determining the in-memory map does indicate the stored output value of the UI script-code snippet, returns the output value of the UI script-code snippet from the in-memory map for use in the current session; or
   in response to determining the in-local storage map does indicate the output value of the UI script-code snippet, returns the output value of the UI script-code snippet from the in-local storage map for use in the current session and store the output value in the in-memory map.

3. The system of claim 2, wherein the browser:
   retrieves the output value of the UI script-code snippet indicated by the in-memory map or the in-local storage map; and
   generates a user interface of the web page based on the retrieved output value of the UI script-code snippet; wherein
      the retrieved output value of the UI script-code snippet comprises a prior executed portion of the web page; and
      said generate a user interface of the web page based on the retrieved output value of the UI script-code snippet is performed faster than generating the user interface based on said control execution of the UI script-code snippet for the current session to generate the output value of the script-code snippet.

4. The system of claim 1, wherein the execution of the UI script-code snippet is performed by the browser.

5. The system of claim 1, further comprising:
a rendering-cost logic engine that:
   determines a cost of performing the execution of the UI script-code snippet; and
   compares the cost to a cost threshold; and a server rendering manager that:
    transmits the UI script-code snippet to a server device for performing the execution of the script-code snippet in response to the cost having a predetermined relationship to the cost threshold; and
    receives the output value of the UI script-code snippet from the server device.

6. The system of claim 1, further comprising a key generator that:
    generates a key by performing a process on the UI script-code snippet and:
        uses the key for said determining whether an in-memory map indicates a stored output value of the UI script-code snippet; or
        uses the key for said determining whether an in-local storage map for the browser indicates the stored output value of the UI script-code snippet.

7. The system of claim 1, wherein the UI script-code snippet is persistently available in the in-local storage map after reloading the web page or after reboot of the client device.

8. The system of claim 1, wherein the current session of the web page is a client side monitored session.

9. The system of claim 1, wherein execution of the UI script-code snippet translates the UI script-code snippet to a monitored UI script-code snippet for enforcing security policies by the browser.

10. The system of claim 2, wherein the script-code snippet manager further:
    in response to the return of the output value of the UI script-code snippet from the in-local storage map or the store of the output value in the in-local storage map:
        updates in the in-local storage map, for a user, a usage parameter that corresponds to the output value of the UI script-code snippet.

11. The system of claim 1, wherein the browser further:
    in response to an initial rendering of the web page in a browser session:
        purges data from the in-local storage map for a user of the web page based on past usage of the data by the user to make storage available for storing at least one additional output value of a UI script-code snippet.

12. A method in a browser in a client device, comprising:
    receiving a user interface (UI) script-code snippet from a web page during a current session;
    determining whether an in-memory map indicates a stored output value of the UI script-code snippet generated by prior execution of the UI script-code snippet;
    in response to determining the in-memory map does not indicate the stored output value of the UI script-code snippet, determining whether an in-local storage map for the browser indicates the stored output value of the UI script-code snippet generated by prior execution of the UI script-code snippet; and
    in response to determining the in-local storage map does not indicate the output value of the UI script-code snippet:
        controlling execution of the UI script-code snippet for the current session to generate the output value of the UI script-code snippet, and
        storing the output value in the in-memory map and in the in-local storage map.

13. The method of claim 12, further comprising:
    in response to determining the in-memory map does indicate the stored output value of the UI script-code snippet, returning the output value of the UI script-code snippet from the in-memory map for use in the current session; or
    in response to determining the in-local storage map does indicate the output value of the UI script-code snippet, returning the output value of the UI script-code snippet from the in-local storage map for use in the current session and storing the output value in the in-memory map.

14. The method of claim 13, further comprising;
    retrieving the output value of the UI script-code snippet indicated by the in-memory map or the in-local storage map; and
    generating a user interface of the web page based on the retrieved output value of the UI script-code snippet;
    wherein the retrieved output value of the UI script-code snippet comprises a prior executed portion of the web page; and
    said generating a user interface of the web page based on the retrieved output value of the UI script-code snippet is performed faster than generating the user interface based on said controlling execution of the UI script-code snippet for the current session to generate the output value of the script-code snippet.

15. The method of claim 12, further comprising:
    determining a cost of performing the execution of the UI script-code snippet;
    comparing the cost to a cost threshold;
    transmitting the UI script-code snippet to a server device for performing the execution of the script-code snippet in response to the cost having a predetermined relationship to the cost threshold; and
    receiving the output value of the script-code snippet from the server device.

16. The method of claim 12, further comprising generating a key by performing a process on the UI script-code snippet and:
    using the key for said determining whether an in-memory map indicates a stored output value of the UI script-code snippet; or
    using the key for said determining whether an in-local storage map for the browser indicates the stored output value of the UI script-code snippet.

17. The method of claim 12, wherein execution of the UI script-code snippet translates the UI script-code snippet to a monitored UI script-code snippet for enforcing security policies by the browser.

18. A computer-readable medium having program code recorded thereon that when executed by at least one processor causes the at least one processor to perform a method, the method comprising:
    receiving a user interface (UI) script-code snippet from a web page during a current session;
    determining whether an in-memory map indicates a stored output value of the UI script-code snippet generated by prior execution of the UI script-code snippet;
    in response to determining the in-memory map does not indicate the stored output value of the UI script-code snippet, determining whether an in-local storage map for the browser indicates the stored output value of the UI script-code snippet generated by prior execution of the UI script-code snippet; and
    in response to determining the in-local storage map does not indicate the output value of the UI script-code snippet:

controlling execution of the UI script-code snippet for the current session to generate the output value of the UI script-code snippet, generating a user interface of the web page based on the generated output value of the UI script-code snippet; and storing the output value in the in-memory map and in the in-local storage map.

19. The computer-readable medium of claim 18, further comprising:

in response to determining the in-memory map does indicate the stored output value of the UI script-code snippet, returning the output value of the UI script-code snippet from the in-memory map for use in the current session; or in response to determining the in-local storage map does indicate the output value of the UI script-code snippet, returning the output value of the UI script-code snippet from the in-local storage map for use in the current session and storing the output value in the in-memory map.

20. The computer-readable medium of claim 19, further comprising:

retrieving the output value of the UI script-code snippet indicated by the in-memory map or the in-local storage map; and generating a user interface of the web page based on the retrieved output value of the UI script-code snippet;

wherein the retrieved output value of the UI script-code snippet comprises a prior executed portion of the web page; and said generating a user interface of the web page based on the retrieved output value of the UI script-code snippet is performed faster than generating the user interface based on said controlling execution of the UI script-code snippet for the current session to generate the output value of the script-code snippet.

* * * * *